United States Patent [19]

Vengsarkar et al.

[11] Patent Number: 5,448,674
[45] Date of Patent: Sep. 5, 1995

[54] ARTICLE COMPRISING A DISPERSION-COMPENSATING OPTICAL WAVEGUIDE

[75] Inventors: Ashish M. Vengsarkar, Chatham; Kenneth L. Walker, New Providence, both of N.J.

[73] Assignee: AT&T Corp., Murray Hill, N.J.

[21] Appl. No.: 197,379

[22] Filed: Feb. 16, 1994

Related U.S. Application Data

[63] Continuation-in-part of Ser. No. 978,002, Nov. 18, 1992, abandoned.

[51] Int. Cl.$^6$ .............................................. G02B 6/10
[52] U.S. Cl. .................................... 385/123; 385/141
[58] Field of Search ................. 385/24, 141, 142, 143, 385/144, 145, 126, 127, 128, 123; 372/6

[56] References Cited

U.S. PATENT DOCUMENTS

| | | | |
|---|---|---|---|
| 4,261,639 | 4/1982 | Kogelnik et al. | 350/96.15 |
| 4,435,040 | 3/1984 | Cohen et al. | 350/96.33 |
| 4,691,991 | 9/1987 | Unger | 385/127 |
| 4,915,468 | 4/1990 | Kim et al. | 385/146 |
| 4,986,624 | 1/1994 | Sorin et al. | 385/30 |

FOREIGN PATENT DOCUMENTS

| | | |
|---|---|---|
| 0307228 | 3/1989 | European Pat. Off. . |
| 62-165608 | 1/1988 | Japan . |
| 03211530 | 12/1991 | Japan . |

OTHER PUBLICATIONS

"Effect of Refractive-index Profiles on Two-mode Optical Fiber Dispersion Compensators", by A. M. Vengsarkar et al., *Optics Letters*, vol. 17, No. 21, Nov. 1, 1992, pp. 1503–1505.

"Dispersion-Compensating Single-Mode Fibers: Efficient Designs for First-and Second-Order Compensation", by A. M. Vengsarkar, *Optics Letters*, vol. 18, No. 11, 1, Jun. 1993, pp. 924–926.

"Lichtwellenleiter Mit Besonderem Dispersionsverhalten", by R. Boness et al., *Nachrichtentechnik Elektronik*, vol. 42, No. 5, Sep. 1992, Berlin DD, pp. 184–187.

"Cutoff Decomposition on Multiply Clad Fibers", by F. Ruhl, *Journal of Lightwave Technology*, vol. LT-4, No. 11, Nov. 1986, pp. 1651–1654.

"Propagation in Doubly Clad Single Mode Fibers", by M. Monerie, *IEEE Journal of Quantum Electronics*, vol. QE-18, No. 4, Apr. 1982, pp. 535–542.

"Dispersion Compensation in 1310 nm-Optimised SMFs Using Optical Equaliser Fibre, EDFAs and 1310/1550 nm WDM", by H. Izadpanah et al. *Electronics Letters*, vol 28, No. 15, 16 Jul. 1992, pp. 1469–1471.

European Search Report, Berlin, Mar. 9, 1994, F. von Moers.

C. D. Poole, et al., *Optics Letters*, 17, No. 14 (Jul. 1992); "Broadband dispersion compensation by using the higher order spatial mode in a two mode fiber".

A. J. Antos, "Design and Characterization of Dispersion Compensating Fiber", Conference on Optic Fiber Measurements, N.I.S.T., Colorado (Sep. 1992).

*Primary Examiner*—Rodney B. Bovernick
*Assistant Examiner*—John Ngo
*Attorney, Agent, or Firm*—Eugen E. Pacher

[57] ABSTRACT

Disclosed is optical fiber that can advantageously be used to compensate chromatic dispersion in an optical fiber communication system, typically a system that is upgraded from 1.3 $\mu$m to 1.55 $\mu$m operating wavelength ($\lambda_{op}$). The fiber typically has a power law core refractive index profile, a refractive index "trench" surrounding the core, and a refractive index "ridge" surrounding the trench. The refractive index profile of the fiber preferably is designed such that the fiber supports the fundamental mode (LP$_{01}$), does not support the LP$_{11}$ mode but does support the LP$_{02}$ mode, all at $\lambda_{op}$. At $\lambda_{op}$, LP$_{01}$ has dispersion more negative than −150 ps/nm·km and, in a preferred embodiment, LP$_{01}$ also has negative dispersion slope at $\lambda_{op}$. In a further embodiment of the invention the refractive index profile is designed such that the cut-off wavelength of the LP$_{11}$ mode is less than that of the higher order mode, typically LP$_{02}$, and less than $\lambda_{op}$, such that the fiber does not support propagation of the LP$_{11}$ mode. In some preferred embodiments the fiber is designed to have dispersion more negative than about −90 ps/nm·km and loss less than about 0.5 dB/km at $\lambda_{op}\sim 1.55$ $\mu$m.

18 Claims, 2 Drawing Sheets

ARTICLE COMPRISING A DISPERSION-COMPENSATING OPTICAL WAVEGUIDE

This application is a continuation-in-part of application Ser. No. 07/978,002, filed on Nov. 18, 1992 now abandoned.

FIELD OF THE INVENTION

This invention pertains to dispersion-compensating (DC) optical waveguides, typically optical fiber, and to communication systems and other articles that comprise a DC optical waveguide.

BACKGROUND OF THE INVENTION

It is well known that conventional $SiO_2$-based single mode optical fiber generally has minimum loss at about 1.55 μm and zero chromatic dispersion at about 1.2 μm. Although it is possible to design optical fiber to have both minimum loss and zero chromatic dispersion at about 155 μm (such fiber is generally referred to as "dispersion-shifted" fiber), most presently installed single mode fiber is of the conventional type and is operated at a signal wavelength of about 1.3 μm, at or close to the zero chromatic dispersion wavelength of the fiber.

Considerable advantages could be realized if already installed optical fiber systems could be operated at 1.55 μm. These advantages include the possibility of increased distance between repeaters (due to the lower fiber loss), and the possibility of using Er-doped fiber amplifiers (EDFAs) instead of repeaters. However, straight-forward upgrade by changing operating wavelength is not practical, due to the significant amount (exemplarily about 17 ps/nm·km) of chromatic dispersion of conventional $SiO_2$-based single mode fiber at 1.55 μm The dispersion typically would limit such a system to a bit rate of at most about 2 Gbit/sec for distances of order 500 miles.

Several possible ways of dealing with the problem have recently been proposed. These can be divided into "active" and "passive" techniques. Herein we are only concerned with passive techniques, in particular, with techniques that involve use of dispersion-compensating (DC) fiber. U.S. Pat. No. 4,261,639 discloses dispersion compensation by catenation of single mode fibers of respectively positive and negative dispersion at the operating wavelength.

DC fiber not only can advantageously be used to upgrade an existing fiber optic communication system but could also be used in new systems (e.g., transoceanic submarine systems that use dispersion-shifted fiber) that are designed to operate at 1.55 μm, e.g., to ease manufacturing specifications on the dispersion-shifted fiber.

C. D. Poole et al., (*Optics Letters*, Vol. 17(14), p. 985; see also co-assigned U.S. patent application Ser. No. 766,600, filed Sep. 26, 1991 now U.S. Pat. No. 5,185,827) disclose a DC fiber designed to support, in addition to the lowest order mode ($LP_{01}$), also the lowest higher order mode ($LP_{11}$), and also designed to have a cut-off wavelength for the $LP_{11}$ ($\lambda_{c11}$) mode just slightly above the operating wavelength ($\lambda_{op}$). Typically, at the upstream end of the DC fiber a mode converter is provided to convert the $LP_{01}$ mode into the $LP_{11}$ mode, and at the downstream end of the DC fiber another mode converter is provided to convert the $LP_{11}$ mode back into the $LP_{01}$ mode. The technique of Poole et al. is able to compensate both dispersion and dispersion slope and can yield desirably large values of negative dispersion (absolute value > 100 or 150 ps/nm·km; exemplarily −228 ps/nm·m). However, the Poole et al. technique undesirably requires use of special components (mode converters and polarization rotators) which not only add cost but also typically introduce additional loss. Furthermore, typically only about 15–20% of the total power propagates within the core, owing to the proximity of $\lambda_{op}$ to $\lambda_{c11}$, typically resulting in relatively high loss. Still furthermore, the prior art technique typically requires slightly elliptical DC fiber to remove the four-fold degeneracy of the $LP_{11}$ mode.

A. J. Antos, (*Proceedings, Conference on Optical Fiber Measurements*, National Institute of Science and Technology, Colo., September 1992, p 89) discloses DC fibers that are designed to support only the $LP_{01}$ mode and to have negative chromatic dispersion at 1.55 μm. The disclosed DC fibers have relatively small negative chromatic dispersion (absolute value ≦ 100 ps/nm·km; exemplarily −65 ps/nm·km), necessitating the use of long lengths (e.g., 39km of DC fiber to compensate the dispersion of 150km of conventional fiber) of DC fiber. Furthermore, the Antos technique apparently is practical only for dispersion compensation, with dispersion slope compensation being considered ". . .not easily achieved in practice . . ." by the author.

In view of the considerable commercial significance of DC, a technique that avoids or at least mitigates the shortcomings of prior art DC techniques would be highly desirable. This application discloses such a technique, and articles that embody the inventive technique.

GLOSSARY AND DEFINITIONS

The "modes" $LP_{\mu\nu}$ are conventionally used in discussions of modal properties of optical fibers, although they are not true but only approximate solutions of the relevant wave equation. The fundamental LP mode is $LP_{01}$. The lowest higher order LP mode is $LP_{11}$. $LP_{0m}$ is of higher order than $LP_{11}$, with m=2, 3, . . .

The term "chromatic dispersion" is herein used in the conventional manner and refers to the sum of material dispersion and waveguide dispersion.

A waveguide "supports" propagation of a given mode of radiation of wavelength $\lambda_{op}$ if the cut-off wavelength $\lambda_c$ of the mode is longer than $\lambda_{op}$, and does not "support" propagation of a given mode if $\lambda_c$ of the mode is shorter than $\lambda_{op}$. In conventional fiber designs the cut-off wavelength of the $LP_{11}$ mode is greater than that of the $LP_{02}$ mode.

THE INVENTION

In a broad aspect the invention is embodied in a novel optical waveguide and in articles that comprise the waveguide. The waveguide is designed to have a relatively large absolute value of chromatic dispersion at an operating wavelength $\lambda_{op}(|D_{DC}(\lambda_{op})|$, where $D_{DC}(\lambda)$ is the chromatic dispersion of the novel waveguide at wavelength $\lambda$), with the sign of the chromatic dispersion being opposite that of the dispersion of a conventional waveguide at $\lambda_{op}$. Optionally, the novel waveguide also has a predetermined value of the dispersion slope at $\lambda_{op}$. In view of its characteristics the novel waveguide can advantageously serve as DC waveguide. Typically, but not necessarily, the optical waveguide is an optical fiber. Those skilled in the art will appreciate that the principles of the invention also apply to non-circular waveguides such as planar waveguides. However, the remainder of the discussion will be in terms of optical fiber.

More particularly, the invention is typically embodied in an article that comprises a length $L_{DC}$ (not necessarily one continuous piece of fiber) of an optical fiber that is designed to support the propagation of radiation of wavelength $\lambda_{op}$ in the fundamental mode ($LP_{01}$) and at least one higher order mode, and the $LP_{01}$ mode has negative chromatic dispersion at $\lambda_{op}$ whose absolute value typically is greater than 150 ps/nm·km. DC fibers having $|D_{DC}(\lambda_{op})| < 100$ or even 150 ps/nm·km typically would require the use of relatively long lengths of DC fiber to compensate the dispersion of conventional optical fiber and for that reason are currently not considered desirable.

Typically, the fiber has a refractive index profile selected such that the fiber does not support propagation of the lowest higher order mode ($LP_{11}$) at $\lambda_{op}$ but does support propagation of at least one higher order mode (typically $LP_{0m}$, where m=2, 3, . . .; preferably m=2) other than $LP_{11}$ at $\lambda_{op}$. Equivalently, the fiber has an index profile that is selected such that there exists a wavelength $\lambda_{op}$ (typically a range of wavelengths) at which the fiber supports the $LP_{01}$ mode and at which the cut-off wavelength of the $LP_{11}$ mode ($\lambda_{c11}$) is less than the cut-off wavelength of at least one $LP_{0m}$ mode ($\lambda_{c0m}$), typically less than $\lambda_{c02}$, the cut-off wavelength of the $LP_{02}$ mode.

In a currently preferred embodiment, the optical fiber is a $SiO_2$-based (i.e., containing everywhere more than 50 mole % $SiO_2$) optical fiber, $\lambda_{op}$ is about 1.55 μm, the fiber supports the propagation of $LP_{02}$ but not of $LP_{11}$ at $\lambda_{op}$, and the fiber has $D_{DC}(\lambda_{op})$ more negative than $-150$ ps/nm·km. Optionally the DC fiber also has a predetermined negative value of the dispersion slope ($D'_{DC}$) at $\lambda_{op}$.

Figure 1:
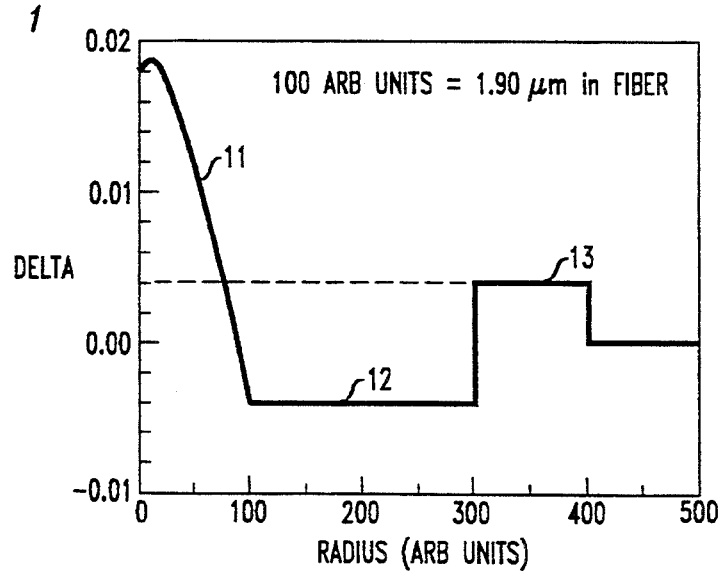
FIGS. 1 and 4 schematically depict exemplary refractive index profiles of DC fiber according to the invention.

FIG. 1 shows the nominal refractive index profile of an exemplary optical fiber according to the invention. Although the radius is expressed in arbitrary units, the profile can also be considered to be quantitative since 100 arbitrary radial units correspond, in a particular embodiment, to 1.9 μm in the fiber. Those skilled in the art know that actual fiber profiles typically depart somewhat from the (ideal) nominal profiles that form the basis of design calculations. However, the properties of actual fibers typically closely correspond to the computed properties of the corresponding models that use nominal fiber profiles, and it is common practice to base new fiber designs on computer simulations.

Figure 4:
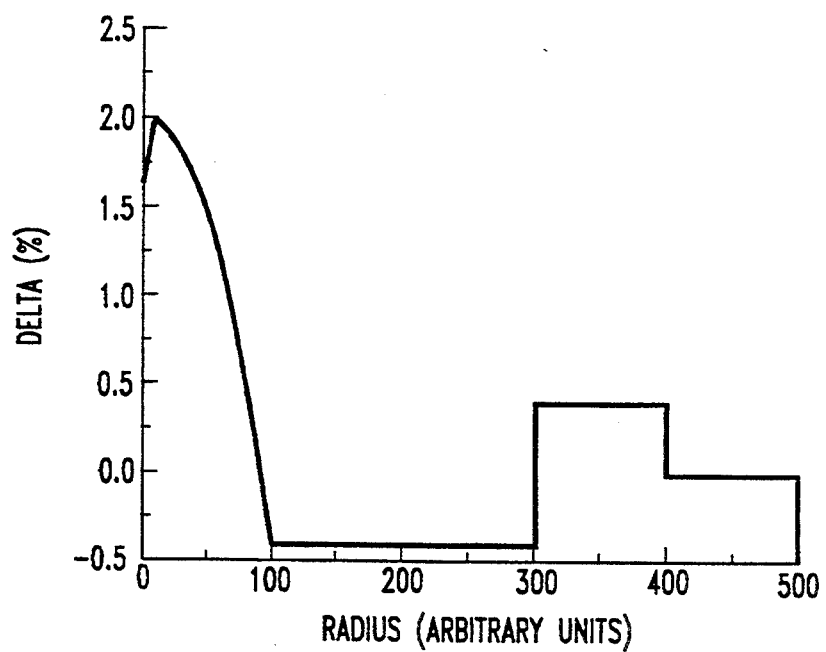

The profile of FIG. 1 comprises core 11, first cladding region (trench) 12, second cladding region (ridge) 13, and third cladding region 14. The exemplary profile of FIG. 1 corresponds to a fiber having a core diameter of 3.8 μm, a maximum core $\Delta$ of about 0.019, an outer trench radius of 5.7 μm, a trench $\Delta$ of about $-0.004$, an outer ridge radius of 7.6 μm, a ridge $\Delta$ of about 0.004, and a third cladding region wherein $\Delta=0$. The third cladding region extends to the fiber surface. The parameter $\Delta$ is defined in the conventional manner, namely $\Delta(r)=(n(r)-n_o)/n_o$, where $n_o$ is the refractive index of pure vitreous $SiO_2$. The ridge is selected to support the $LP_{02}$ mode. Generally speaking, if it is desired that a DC fiber support the $LP_{0m}$ mode, then the fiber exemplarily can have m-1 appropriately placed ridges. A further exemplary refractive index profile is shown in FIG. 4. The core has a power law profile, with $\alpha=2.2$, and 300 arbitrary (radial) units correspond to 5 μm in the fiber.

Typically, DC fiber according to the invention will comprise the above referred to core and first-third cladding regions. The first cladding region will be immediately adjacent to the core and have a refractive index that is lower than the refractive index of any region outside of the first cladding region. The refractive index of the second cladding region will have a value between the maximum core refractive index and the first region refractive index, and the position of the second cladding region will be selected such that the desired higher order mode (e.g., $LP_{02}$) is excited before $LP_{11}$. Finally the third cladding region will have a refractive index of value between that of the first and second cladding regions. Frequently the third cladding region will comprise nominally pure silica.

Exemplarily, a fiber according to the invention (for m=2) typically will have a generic power-law core profile, with maximum $\Delta$ in the core typically greater than 0.015, a trench with $\Delta$ typically $<-0.003$, and a ridge with $\Delta>0$, and furthermore chosen such that $\lambda_{c02}>\lambda_{c11}$.

The presence of i) a relatively large index difference between the high $\Delta$ core and the trench and ii) the raised ridge makes it possible for the $LP_{01}$ mode to have a finite cut-off wavelength, i.e., above a finite wavelength $\lambda_{c01}$ the $LP_{01}$ mode is leaky or non-guided. As a consequence of this property the propagation constant of the $LP_{01}$ mode approaches zero at a relatively fast rate near $\lambda_{c01}$, as compared to the relatively slow approach to zero in a conventional fiber. Since the propagation constant approaches zero rapidly, the first and second derivatives (with respect to wavelength) of the propagation constant (which define the dispersion of the fiber) are large, a property that is generally desirable for dispersion compensation. Furthermore, the operation of $LP_{01}$ relatively close to $\lambda_{c01}$ can provide for both negative dispersion and negative dispersion slope.

The above theoretical remarks are offered as an aid to understanding but are not intended to limit the scope of the invention.

Fiber refractive index profiles that comprise a relatively high index core region surrounded by a relatively low index cladding region, in turn surrounded by an intermediate index cladding region which in turn is surrounded by a cladding region of refractive index lower than the intermediate index are known. See, for instance, FIG. 1 of U.S. Pat. No. 4,435,040. However, we know of nothing in the prior art that suggests that such a profile could be designed to meet the above disclosed criteria. Indeed, the prior art profiles pertain to optical fiber that is single mode at the design operating wavelength.

The fibers of FIGS. 1 and 4 can be made by conventional means. The core typically will be Ge-doped, the trench down-doped with F, the ridge lightly up-doped with Ge, and region 14 typically will be undoped $SiO_2$.

The fiber of FIG. 1 has $\lambda_{c02}$ of about 1.600 μm, and $\lambda_{c11}$ of about 1.565 μm. Although FIG. 1 shows an approximately triangular (power-law exponent $\alpha = 1.5$) core profile;this is not a necessary requirement, and other core profiles such as parabolic or step profiles could be used.

Figure 2:
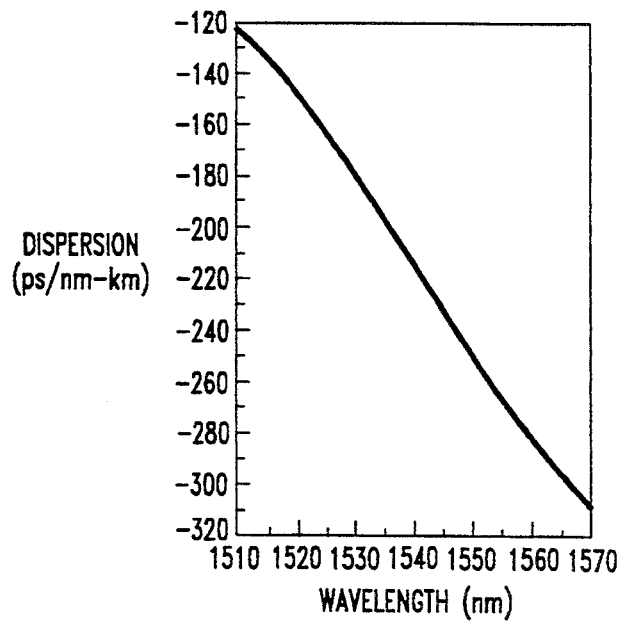
FIGS. 2 and 5 show the dispersion of fiber of FIGS. 1 and 4, respectively, as a function of wavelength.
Figure 5:
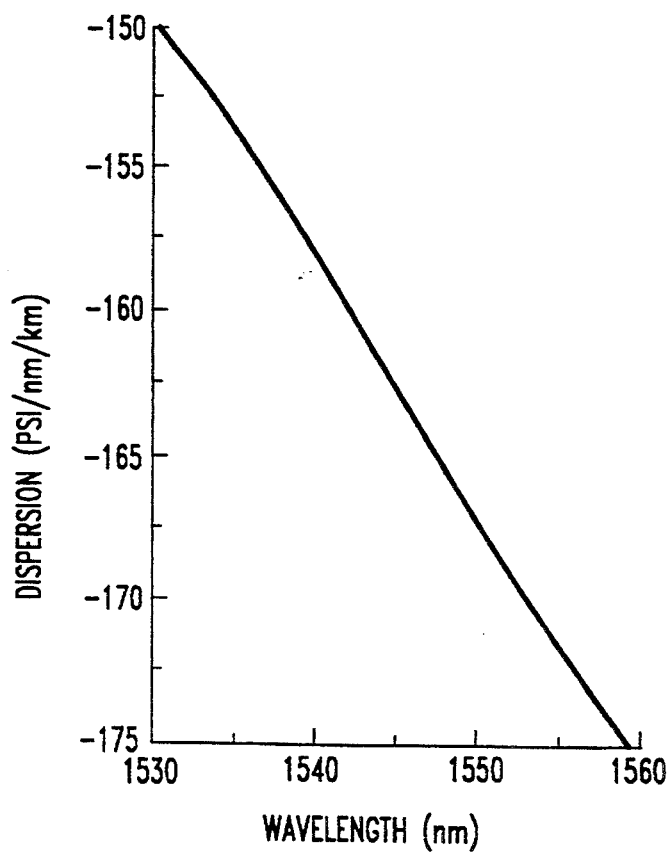

FIGS. 2 and 5 show the (computed) dispersion of the fibers of FIGS. 1 and 4, respectively, as a function of wavelength. As can be seen, the exemplary fibers have quite large (negative) dispersion (e.g., −260 ps/nm·km at 1550 nm), making them effective DC fibers. Exemplarily, the dispersion of 50 km of conventional single mode fiber (dispersion 17 ps/nm·km at 1.55 μm) could be compensated with a mere 3.3 km of the exemplary fiber of FIG. 1.

Fiber according to the invention can be joined directly, without intermediate mode converter, to conventional single mode transmission fiber. Most of the optical power that is coupled into the inventive fiber will continue to propagate in the $LP_{01}$ mode, with only a minor portion of the power in the $LP_{02}$ mode. Due to the proximity of $\lambda_{op}$ to $\lambda_{c02}$, the $LP_{02}$ mode is quite susceptible to bending loss. This will typically be an advantage, since it facilitates removal of $LP_{02}$ mode power by simple means, e.g., coiling the length of DC fiber. Thus is can be readily arranged that at the downstream end of the DC fiber essentially all of the optical power is in the $LP_{01}$ mode, facilitating direct joining to conventional single mode transmission fiber or other conventional components.

Furthermore, waveguides according to the invention not only can compensate chromatic dispersion but also the dispersion slope at a given system operating wavelength. By "dispersion slope" (designated herein D') at a wavelength $\lambda_{op}$ we mean the value of the first derivative of the chromatic dispersion with respect to wavelength at $\lambda_{op}$. Exemplarily, appropriate choice of fiber profile makes it possible to compensate the dispersion slope of standard single mode fiber such that the system can exhibit very low chromatic dispersion over a significant spectral region, e.g., have less than about 1.5 ps/nm·km dispersion over a wavelength range of at least 50 nm width in the 1.55 μm wavelength region. This feature can be advantageously used in wavelength division multiplexed (WDM) systems.

Those skilled in the art will know that the dispersion slope of an optical fiber is proportional to the negative of the second derivative of the propagation constant with respect to the V-number of the fiber. Typically, conventional single mode fiber has a positive dispersion slope at 1.55 μm. In order to compensate the dispersion slope $D'_{SM}$ of a given length $L_{SM}$ of conventional single mode fiber at, e.g., 1.55 μm with a length $L_{DC}$ of DC fiber, the index profile of the DC fiber is selected such that, at the V-number that corresponds to $\lambda = 1.55$ μm, the above referred-to second derivative is positive and of magnitude such that the dispersion slope of the DC fiber ($D'_{DC}$) is substantially equal to $(D'_{SM})(L_{SM}/L_{DC})$. The selection can readily be made by computer modeling, using well known techniques. For instance, the fiber of FIG. 4 has dispersion at 1.55 μm more negative than 150 ps/km·nm, and has dispersion slope of about $-0.8$ ps/km·nm$^2$ at 1.55 μm. Thus, about 4.4 km of that fiber can compensate the dispersion slope of 50 km of a single mode fiber having dispersion slope at 1.55 μm of 0.07 ps/km·nm$^2$, a typical value.

Those skilled in the art will appreciate that an optical fiber communication system according to the invention can take many forms, and all such embodiments are contemplated. For instance, in order to upgrade a conventional (1.3 μm) system, each regenerator can be replaced by an EDFA with associated length $L_{DC}$ of DC fiber according to the invention. Although it will generally be appropriate to insert a single length of DC fiber into each fiber span, this is not necessarily so. At least in principle it is possible to inset shorter pieces of DC fiber at several points of a span, or to insert all of the required DC fiber at a single location, e.g., at the receiver location or even at the transmitter. Since there is signal attenuation associated with DC fiber according to the invention, it will at times be appropriate to dope the core of the DC fiber with appropriate rare earth ions (e.g., $Er^{3+}$), and to provide an appropriate pump radiation source. In this manner a length of DC fiber can be made to appear substantial loss-less for signal radiation. Of course, DC fiber could also be rare earth-doped such that the fiber provides net gain, advantageously serving both as dispersion compensator and optical amplifier.

Figure 3:
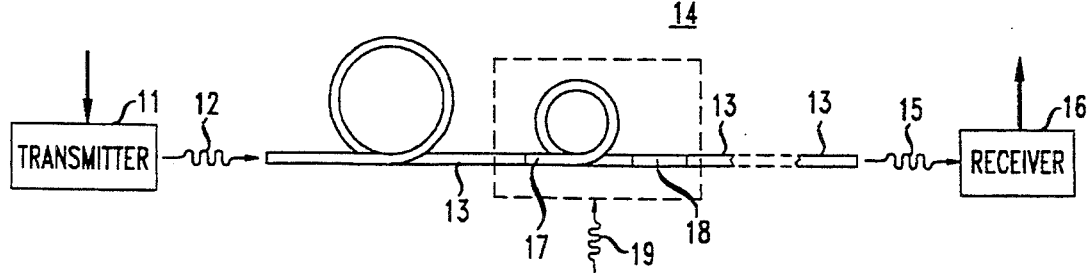
FIG. 3 schematically depicts an exemplary fiber communication system according to the invention. If the dispersion of the conventional waveguide is positive at $\lambda_{op}$, then the DC fiber is designed to have negative dispersion at $\lambda_{op}$.

FIG. 3 schematically depicts an exemplary optical fiber communication system according to the invention, wherein numeral 12 refers to signal radiation emitted by transmitter 11 which is guided in transmission fiber 13 to optical amplifier/dispersion compensator 14, is then typically guided through further lengths of transmission fiber and further amplifiers/compensators (not shown) to receive 16. Exemplarily the amplifier/compensator 14 comprises a length of DC fiber 17 and EDFA 18. Pump radiation 19 is provided to combination 14, to be coupled into the EDFA. It will be appreciated that the functions of compensation and amplification could be performed by rare earth-doped DC fiber.

A frequently used figure of merit for DC fiber is the ratio of the absolute value of the dispersion ($|D_{DC}|$) to the fiber loss, both at the relevant wavelength, typically 1.55 μm. We have now found that, at least under some circumstances, a fiber that has $|D_{DC}|$ of only 100 ps/nm·km or even somewhat less (typically $|D_{DC}| > 90$ ps/nm·km) can have a higher value of that figure of merit than a fiber of $|D_{DC}|$ of, e.g., 150 ps/nm·km, since attainment of such large values of dispersion frequently requires quite high core doping levels, which in turn can cause relatively high loss. For instance, core deltas of about 2% were desirable for obtaining dispersions of about $-175$ to $-200$ ps/nm·km, resulting in fiber having a loss of about 3 dB/km. On the other hand, it is possible to attain dispersion of about $-100$ ps/nm·km, with fiber having a core delta of about 1.5% and a loss of less than about 0.5 dB/km. Thus, from a systems design point of view, it will frequently be preferable to install DC fiber that has less than the highest attainable dispersion value, since installation of lower dispersion fiber may result in lower overall system loss. A further advantage of fiber that has somewhat lower dispersion (e.g., about $-100$ ps/nm·km) is that such fiber can have lower bend loss than analogous fiber of higher dispersion, making possible use of more compact dispersion compensation packages. We have also found that it may at times be advantageous to design a DC fiber such that the cut-off wavelength for the at least one higher order mode is in the approximate range 1.35–1.60 μm. Thus, for $\lambda_{op}$ of about 1.55 μm, the relevant higher order mode (typically $LP_{02}$) may actually be lost from the fiber, thereby eliminating the need of stripping the higher order mode from the fiber prior to signal detection. In all cases, however, the fiber is designed to not support the propagation of the $LP_{11}$ mode, and the cut-off wavelength of $LP_{11}$ is less than the cut-off wavelength of the relevant higher order mode, typically $LP_{02}$. In some preferred embodiments, the slope of the dispersion as a function of wavelength is negative.

Exemplarily, a DC fiber according to the invention has a refractive index profile substantially as shown in FIG. 1, except that the core is a power law graded index core with exponent 6, the core has a diameter of 3.5 μm and a delta of 1.4%, cladding region 12 has delta of −0.6% and width 3.5 (25/16) μm, and cladding region 13 has delta of 0.5% and width 3.5 (10/16) μm. The fiber has loss less than 0.5 dB/km and dispersion of about −136 ps/nm·km at 1.55 μm, with the dispersion slope being about −0.767 ps/nm²·km over the range 1530–1560 nm. The cut-off wavelengths for $LP_{01}$, $LP_{11}$ and $LP_{02}$ are, respectively, 1.02 μm and 1.50 μm.

Those skilled in the art will realize that the amount of dispersion compensation will frequently depend on such systems aspect as data rate and span length, and that exact compensation of total span dispersion may frequently not be necessary. For instance, in a 10 Gbit/s system with span length of 120 km, it may frequently be sufficient to compensate for the dispersion of only about 100 km of the single mode fiber. In general, we contemplate compensation of at least about 80% of the span length. In other words, we contemplate systems wherein up to about 20% of the span dispersion remains uncompensated.

We claim:

1. An article comprising a length $L_{DC}$ of optical fiber (said fiber to be designated "DC" fiber) designed to support propagation of radiation of wavelength $\lambda_{op}$ in a fundamental mode and at least one higher order mode, the DC fiber having a refractive index profile, and $\lambda_{op}$ being about 1.55 μm;

CHARACTERIZED IN THAT
   said refractive index profile is selected such that the radiation in the fundamental mode has dispersion $D_{DC}(\lambda_{op})$ at wavelength $\lambda_{op}$ that is more negative than −150 ps/nm·km.

2. The article of claim 1, wherein the refractive index profile is selected such that the DC fiber does not support propagation of the $LP_{11}$ mode of the radiation of wavelength $\lambda_{op}$ and does support propagation of the $LP_{02}$ mode of said radiation.

3. The article of claim 1, wherein the article is an optical fiber communication system that comprises a source of radiation of wavelength $\lambda_{op}$, detector means for detecting radiation of wavelength $\lambda_{op}$ that are spaced from said source of radiation, and an optical fiber transmission path that radiation-transmissively links said source and said detector means, with said optical fiber transmission path comprising said length $L_{DC}$ of DC fiber, and further comprising a length $L_{SM}$ of single mode optical fiber having chromatic dispersion $D_{SM}(\lambda_{op})$ at $\lambda_{op}$, with $L_{DC}$ and $L_{SM}$ selected such that $L_{DC} \cdot D_{DC}(\lambda_{op}) + L_{SM} \cdot D_{SM}(\lambda_{op})$ is approximately equal to zero.

4. The article of claim 3, wherein the refractive index profile is further selected such that the absolute value of $(L_{DC} \cdot D_{DC}(\lambda) + L_{SM} \cdot D_{SM}(\lambda))/(L_{DC} + L_{SM})$ is less than 1.5 ps/nm·km for all wavelengths $\lambda$ in a wavelength range that is greater than 50 nm and includes $\lambda_{op}$.

5. An article of claim 1, wherein the DC fiber comprises at least one rare earth species capable of stimulated emission at the wavelength $\lambda_{op}$, and wherein the article comprises means for coupling pump radiation of wavelength $<\lambda_{op}$ into the DC fiber.

6. The article of claim 5, wherein $\lambda_{op}$ is about 1.55 μm and the rare earth species is Er.

7. An article comprising a length of optical fiber (said fiber to be designated "DC" fiber) designed to support propagation of radiation of wavelength $\lambda_{op}$ in a fundamental mode and at least one higher order mode, the DC fiber having a refractive index profile;

CHARACTERIZED IN THAT
   said refractive index profile is selected such that the DC fiber does not support propagation of radiation of wavelength $\lambda_{op}$ in the $LP_{11}$ mode and supports propagation of radiation of wavelength $\lambda_{op}$ in at least one other higher order mode (designated $LP_{0m}$, m=2, 3, . . .), wherein the DC fiber has a core having normalized maximum refractive index difference $\Delta_c > 0$, the core contactingly surrounded by a cladding comprising, in outwardly directed sequence, a first cladding region (the "trench") having normalized refractive index difference $\Delta_1 < 0$, a second cladding region (the "ridge") having normalized refractive index difference $\Delta_2$ selected such that $0 < \Delta_2 < \Delta_c$, and a third cladding region having normalized refractive index difference $\Delta_3 < \Delta_2$.

8. The article of claim 7 wherein m=2, $\Delta_c > 0.015$, $\Delta_1 < -0.003$ and $\Delta_3 = 0$, with the refractive index profile selected such that the cut-off wavelength of $LP_{11}$ is less than the cut-off wavelength of $LP_{02}$.

9. The article of claim 7, wherein said third cladding region extends to the surface of the DC fiber, and wherein $\Delta_3$ is substantially constant as a function of radial distance.

10. An article comprising a length $L_{DC}$ of optical fiber (said fiber to be designated "DC" fiber) designed to support propagation of radiation of wavelength $\lambda_{op}$ in a fundamental mode, the DC fiber having a refractive index profile, cut-off wavelengths respectively for a mode designated $LP_{11}$ and a given higher order mode other than $LP_{11}$;

CHARACTERIZED IN THAT
   said refractive index profile is selected such that
   i) the cut-off wavelength for the $LP_{11}$ mode is less than the cut-off wavelength for said given higher order mode; and
   ii) the cut-off wavelength for the $LP_{11}$ mode is less than $\lambda_{op}$, such that the DC fiber does not support propagation of said $LP_{11}$ mode at $\lambda_{op}$.

11. The article of claim 10, wherein said given higher order mode is the $LP_{02}$ mode, the cut-off wavelength for the $LP_{02}$ mode is in the wavelength range 1.35 μm to 1.60 μm, and $\lambda_{op}$ is about 1.55 μm.

12. The article of claim 11, wherein the cut-off wavelength of the $LP_{02}$ mode is less than $\lambda_{op}$.

13. The article of claim 12, wherein the article is an optical fiber communication system that comprises a source of radiation of wavelength $\lambda_{op}$, detector means for detecting radiation of wavelength $\lambda_{op}$ that are spaced from said source of radiation, and an optical fiber transmission path that radiation-transmissively links said source and said detector means, with said optical fiber transmission path comprising said length $L_{DC}$ of DC fiber, and further comprising a length $L_{SM}$ of single mode optical fiber having chromatic dispersion $D_{SM}(\lambda_{op})$ at $\lambda_{op}$, with $L_{DC}$ and $L_{SM}$ selected such that $L_{DC} \cdot D_{DC}(\lambda_{op}) + L_{SM} \cdot D_{SM}(\lambda_{op})$ is less than 0.2

($L_{SM} \cdot D_{SM} (\lambda_{op})$), where $L_{SM}$ is a span length of the communication system.

14. The article of claim 13, wherein the refractive index profile is further selected such that the absolute value of $(L_{DC} \cdot D_{DC} (\lambda) + L_{SM} \cdot D_{SM} (\lambda))/(L_{DC} + L_{SM})$ is less than 1.5 ps/nm·km for all wavelengths $\lambda$ in a wavelength range that is greater than 50 nm and includes $\lambda_{op}$.

15. The article of claim 10, wherein said refractive index profile is selected such that the radiation in the fundamental mode has dispersion $D_{DC} (\lambda_{op})$ at wavelength $\lambda_{op}$ that is more negative than about $-90$ ps/nm·km, with $\lambda_{op}$ being about 1.55 µm.

16. The article of claim 10, wherein the DC fiber has a core having normalized maximum refractive index difference $\Delta_c > 0$, the core contactingly surrounded by a cladding comprising, in outwardly directed sequence, a first cladding region (the "trench") having normalized refractive index difference $\Delta_1 < 0$, a second cladding region (the "ridge") having normalized refractive index difference $\Delta_2$ selected such that $0 < \Delta_2 \Delta_2 < \Delta_c$, and a third cladding region having normalized refractive index difference $\Delta_3 < \Delta_2$, wherein said higher order mode is the $LP_{02}$ mode, and $\Delta_c$ is less than 1.5%.

17. The article of claim 10, wherein the DC fiber comprises at least one rare earth species capable of stimulated emission at the wavelength $\lambda_{op}$, and wherein the article comprises means for coupling pump radiation of wavelength $< \lambda_{op}$ into the DC fiber.

18. The article of claim 17, wherein $\lambda_{op}$ is about 1.55 µm and the rare earth species is ER.

* * * * *

UNITED STATES PATENT AND TRADEMARK OFFICE
CERTIFICATE OF CORRECTION

PATENT NO. : 5,448,674
DATED : September 5, 1995
INVENTOR(S) : Ashish M. Vengsarkar, et al.

It is certified that error appears in the above-indentified patent and that said Letters Patent is hereby corrected as shown below:

Column 10, line 4, "$0 < \Delta_2 \Delta_2 < \Delta_c$" should read --$0 < \Delta_2 < \Delta_c$--.

Signed and Sealed this

Twenty-eighth Day of November 1995

Attest:

BRUCE LEHMAN

*Attesting Officer*     *Commissioner of Patents and Trademarks*